Dec. 15, 1970     F. A. BETRON     3,547,537

PRESSURABLE CONTACT PRINTING MECHANISM

Filed March 25, 1968     2 Sheets-Sheet 1

FIG. I

INVENTOR
FRANCIS A. BETRON

BY

HIS ATTORNEYS

United States Patent Office 3,547,537
Patented Dec. 15, 1970

3,547,537
PRESSURABLE CONTACT PRINTING
MECHANISM
Francis A. Betron, Kettering, Ohio, assignor to The National Cash Register Company, Dayton, Ohio, a corporation of Maryland
Filed Mar. 25, 1968, Ser. No. 715,906
Int. Cl. G03b 27/20
U.S. Cl. 355—92     15 Claims

ABSTRACT OF THE DISCLOSURE

A contact printing device having a chamber, a transparent glass plate forming one side of the chamber, a photographic master plate forming another side of the chamber and capable of being convexly shaped, and means including a resilient platen for pressing a film against the surface of said master plate initially along a line and progressing outwardly from the line across the plate to provide maximum contact over the printing area. Air pressure is introduced into the chamber to convexly shape the master plate, and an opposing force is provided by the platen to counterbalance the air pressure and tend to straighten the master plate during the contact and printing time.

BACKGROUND OF THE INVENTION

The prior art shows the use of various devices and apparatus for reproducing images from a master plate onto a photographic film, which film is later viewed to obtain the desired information therefrom. An apparatus commonly termed a contact printer or contact printing mechanism is extremely useful in the microfilm industry and permits the storage of much information in a minimum of space. In this respect, the prior art teaches that very high resolution microimages can be formed by projection onto a photochromic emulsion that is coated on a glass plate, this being a master negative or the like. It is also known that permanent copies of the images formed in the coating can, by printing on contact, be reproduced onto a high resolution photographic film with a contact printer having a resilient support. The prior art also teaches the use of a pressure member for pressing a photographic film against a master plate wherein the member is provided with a curved surface that initially applies pressure at only a very small area on the photographic film. By starting with a very small area of contact, any light interference fringes are minimized as the entire area becomes subjected to the contact mechanism, and any bubbles or pockets of air are eliminated by being pushed outwardly to the edges of the master plate, thus providing for optimum contact. Representative of such prior art, United States Pat. No. 3,316,825, issued May 2, 1967, on the application of Carl O. Carlson et al. and assigned to the same assignee as this application, shows the master plate supported by a relatively rigid transparent plate through which light rays from a light source reproduce the image from the emulsion coated on the master plate onto the film, thus exposing it. Briefly, that patent utilizes a curved pressure member of rigid construction, a flat master plate, and a flat back-up plate whereby the curved member initially contacts the film and the master plate at a small area and then makes full contact by bending the master and back-up plates to conform to the curve of the pressure plate. While the contact printer apparatus in the abovementioned United States patent has been useful, the apparatus leaves something to be desired, and therefore improvements are constantly being sought in the field of contact printing.

SUMMARY OF THE INVENTION

The present invention relates to a photographic contact printer and, more particularly, to an improved device for printing high resolution images by establishing a high degree of contact between the surfaces of a master negative and a film onto which the images are printed.

One of the problems encountered in contact printing has been the presence of air bubbles or pockets of air which become entrapped in the emulsified surface between the negative and the film. This is due to the slight variation in thickness of the emulsion coating on the master negative, and, as the surfaces make contact during the printing process, the bubbles or pockets of air are captured and thus show on the exposed film. This has been partially solved by the use of a pressure member having a curved surface, so that, upon initial contact, a line or very small area of contact is subjected to the pressure member, and, as the member is pressed against the master plate, the contact area along the curvature is increased, and any air bubbles or pockets of air are forced outwardly, thus insuring good contact between the master plate and the film.

The present invention includes a master plate supporting chamber, a master plate which forms one side of the chamber and upon which the emulsion is coated, the plate being capable of flexing under a force or pressure, and a resilient platen which is brought to bear upon a film interposed between the platen and the master plate for reproducing the image on the film. Pressure is introduced into the chamber to flex the master plate upwardly, and the platen, in moving downwardly, counteracts with an equal and opposite force which causes initial contact of the two surfaces along a line, and continued movement of the platen tends to straighten the flexed master plate, so that the contact area is extended outwardly toward the edges of the plate, thus insuring optimum contact. The platen has a contact surface which is inherently resilient, so that, if, on substantially full pressure or force of the descending platen, the master plate is not returned to its unflexed condition, or if the air pressure inside the chamber is not decreased sufficiently to allow the master plate to be returned to its unflexed condition, the platen extends around the slight curvature in the plate to insure the optimum contact. It has been found that this construction provides superior contact in reproducing the image onto the film, and also reduces and generally eliminates breakage of the parts, the breakage having been one of the disadvantages of prior structures.

Therefore, the main object of the present invention is to provide an improved contact printing device which insures maximum contact over the printing area.

Another object of this invention is to provide a flexible master element capable of responding to an opposing force member wherein the initial contact between the element and the member is along a line, and further force realizes full contact therewith.

A further object is to provide means for flexing the master element to a position such that the initial surface contact pressure is at the center of the element, and further pressurized movement of the opposing force member tends to straighten the element under continuing contact across the surface.

Additional features and advantages of the present invention will be fully understood from the following description, taken together with the annexed drawings, in which.

Figure 1:
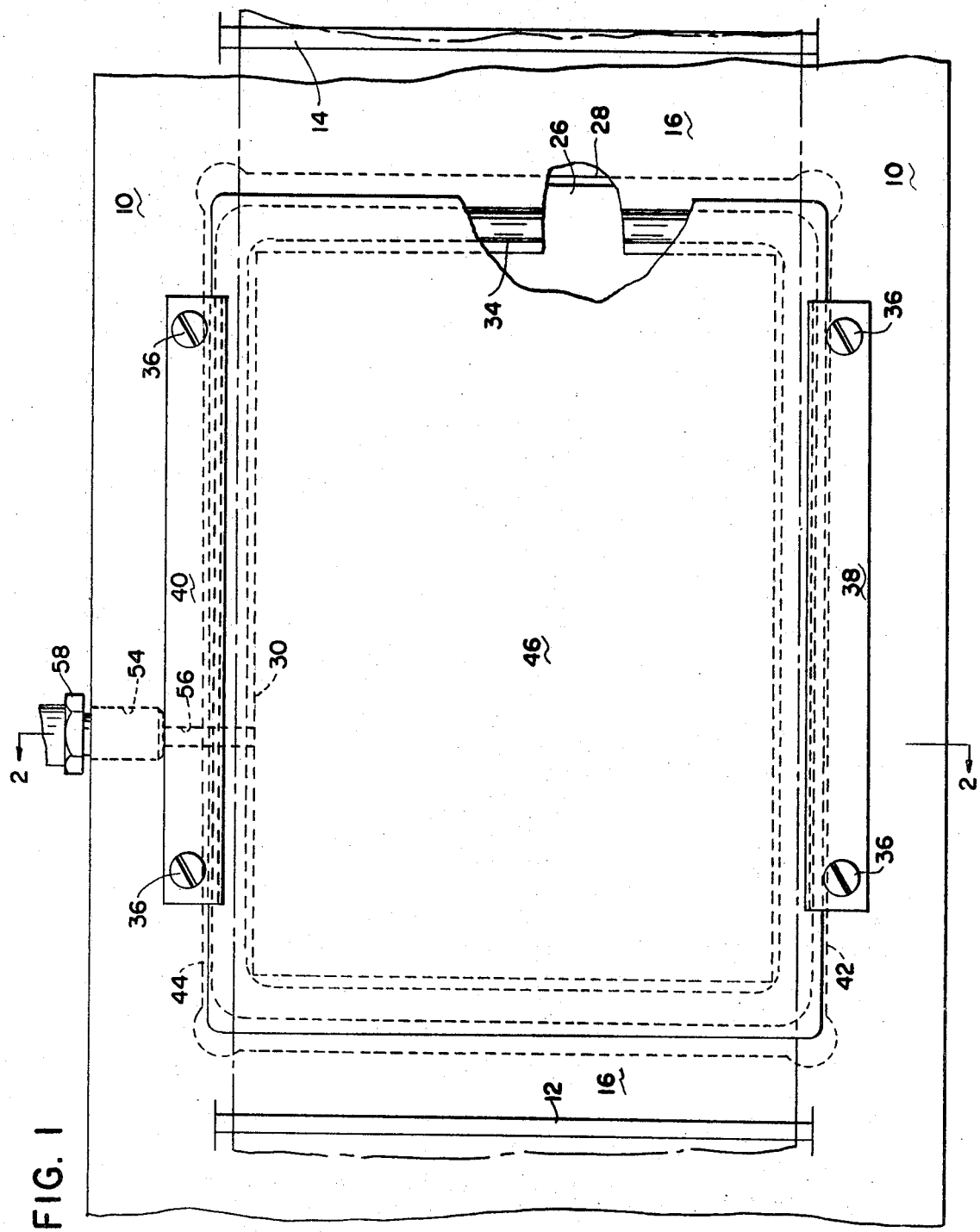
FIG. 1 is a partial plan view of a printing mechanism embodying the invention, taken along line 1—1 of FIG. 2.
Figure 2:
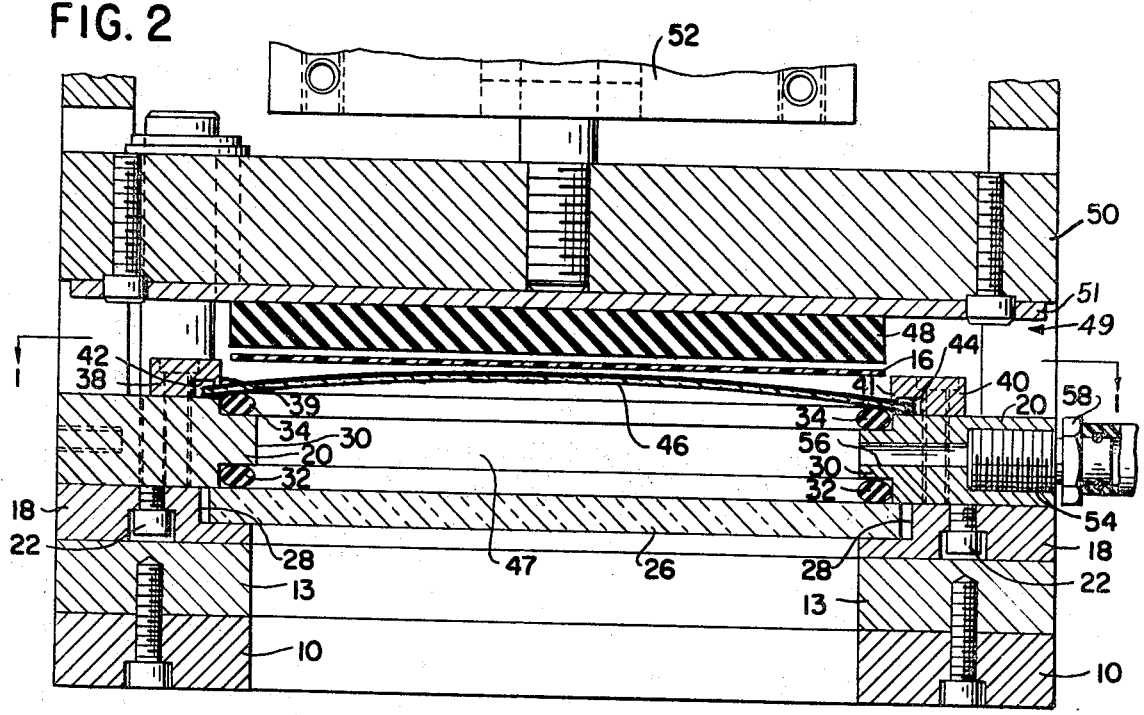
FIG. 2 is a view in section taken along line 2—2 of FIG. 1, showing the platen in a raised position, the photographic film below the platen, and the master plate in a pressurized or flexed condition.
Figure 3:
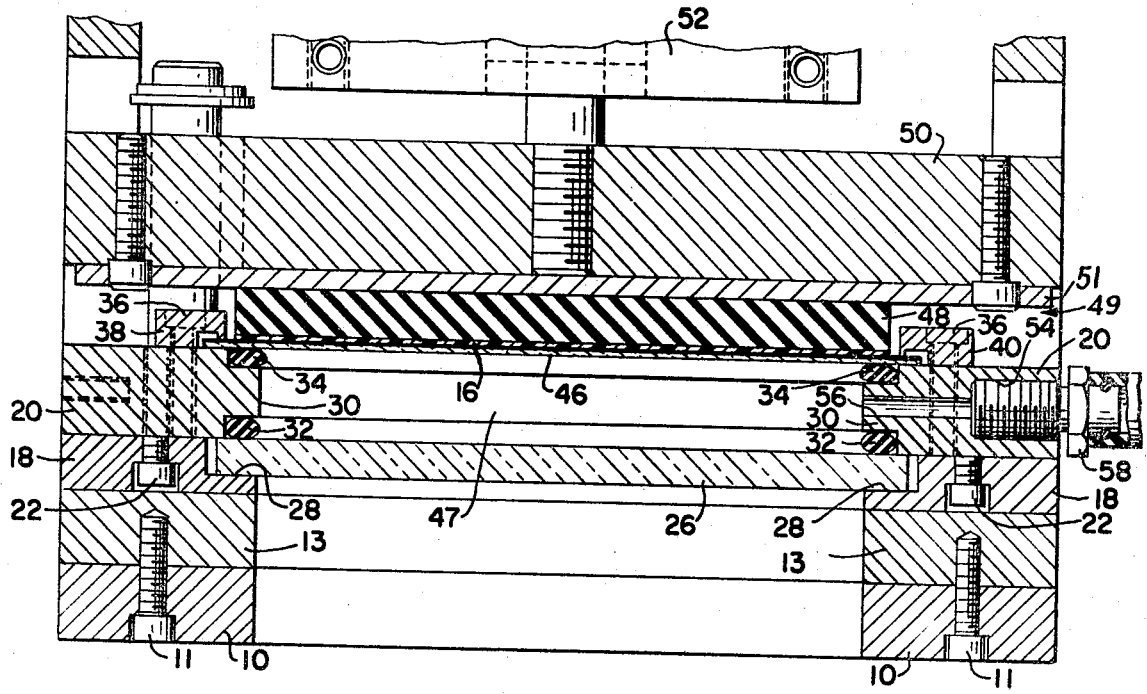
FIG. 3 is a view in section similar to FIG. 2 but showing the position of the parts in the full contact condition.

As seen in FIG. 1, the contact printing mechanism rests on a base plate 10, which may be mounted on a bench or the like for convenient operational height, and, as seen in FIGS. 2 and 3, the printer has a left reel 12 and a right reel 14, shown in diagrammatic form, which are mounted on shafts supported from side plates secured to the base plate. The printer also includes timing devices, pneumatic control means, and associated circuitry for automatic operation. As mentioned above, Carlson et al. U.S. Pat. No. 3,316,825 shows and describes a printer which includes many of the parts and features utilized with the present invention; therefore it is believed that the teaching of the Carlson et al. patent as to the general structure need not be repeated except as it relates to the present invention.

A high resolution flexible photographic film 16 is initially placed on the reel 12 and is made to unwind therefrom and to wind onto the reel 14 by mechanism described in the above-mentioned United States patent. Generally described, as the film travels from the left reel to the right reel, from feed to take-up, images are impressed upon the film from a master by contact therewith, and the admittance of light thereupon exposes the film.

The contact printing apparatus of the present inventtion include a first member or plate support 18 and a second member or guide plate 20 interconnected and secured by screws 22 (FIG. 2). The member 18 is a generally rectangularly shaped metal frame piece having its central opening aligned with like openings in the base plate 10 and a bottom die plate 13. A transparent glass plate 26, also rectangularly shaped, is seated on a ledge of a recess or cutout 28 extending around the central opening top side of the member 18. The member 20 is also a generally rectangularly shaped metal frame piece which is disposed above the member 18 and includes a central interior lip 30, which spaces a pair of lower and upper O-rings 32 and 34. These rings are formed to seat on either side of the lip 30 and to form a seal between the lip and adjacent members; therefore they also assume a rectangular shape when in position, as seen in FIG. 1.

Adjacent the upper surface of the member 20 and secured thereto by means of screws 36 are side rails or clamps 38 and 40 having recesses or grooves 42 and 44, respectively (FIG. 2). A master plate 46, also rectangular in shape, is spaced upwardly from the glass plate 26 and is held in place within the clamp grooves 42 and 44, which are cut slightly deeper than the thickness of the plate 46 for purposes to be described. The plate 46 itself includes the master negative image on its top side and is made of material providing for flexing in a convex position in relation to the glass plate 26, or bowed upwardly therefrom as seen in FIG. 2. In the straight, or unflexed, condition, as shown in FIG. 3, a chamber 47 is realized, wherein the rings 32 and 34 provide an air-tight enclosure in the space between the several plates 26 and 46. The clamp 38 is secured along one side and the clamp 40 along the opposite side of the master plate 46, also seen in FIG. 1, the clamp 38 having a lip 39 and the clamp 40 having a lip 41 running along the interior edge and engageable with the master plate for frictionally restraining it in the recesses.

Disposed above the master plate 46 is a platen assembly 49 having an anchor plate 51 secured to a head or top die plate 50, in turn fixed to a piston and cylinder device 52, which is utilized to raise and lower the platen assembly 49. The platen assembly includes a platen 48 that is somewhat resilient in character in the it is composed of a silicone type rubber in the 70 durometer range. When the master plate 46 is made to curve slightly upwardly in the printing operation, the platen 48 conforms to the surface of the plate and thus insures that there is good contact between the film 16 and the master plate.

Positioned in one side of the guide plate 20 is an air pressure inlet including a threaded bore 54 connecting with a small passageway 56, which starts at the bore and terminates within the chamber 47 at the interior edge of the lip 30. A connector 58 is installed in the bore 54 and is connected to an air line with a supply pressure of at least 10 p.s.i. In the specific embodiment, the master plate 46 covers approximately thirty square inches, so that a pressure of approximately 300 pounds is available in the chamber and against the under side of the master plate 46.

FIGS. 2 and 3 show the position of the piston and cylinder assembly, the platen, the film, and the master plate under the respective conditions of advancing the film into place and of printing onto the film by contact. The base plate 10 includes a central opening corresponding in size to the openings in the die plate 13 and the support member 18 for admission of light energy which exposes the film as it travels across the printer from one reel to the other. A typical light source is shown and described in the above-noted Carlson et al. United States patent. Of course, the entire operation is automatically timed, and the time of one operation consumes about four seconds, which itself is split essentially as follows: one second to feed the film into position above the master plate, two seconds to make full contact of the descending platen with the film onto the master plate, and one second for admission of light to expose the film.

In the operation of the printing mechanism of the present invention, the platen 48 is in the raised position as the film 16 is incrementally advanced to the correct position between the platen and the master plate 46, air pressure is introduced into the chamber 47 between the plates 26 and 46 of sufficient magnitude to bow the plate 46 into a convex shape, as shown in FIG. 2, the platen is then lowered against the film, which presses the film initially in a line contact against the master plate 46, and continued lowering of the platen 48 tends to straighten the master plate 46 to the position seen in FIG. 3. As mentioned above, the air pressure at the inlet to the chamber 47 is about 10 p.s.i., so there is an initial pressure of near 300 pounds on the master plate 46, which causes the slight convex shape on the plate. The convexity, as shown in FIG. 2, is exaggerated for simplicity and also for clearly showing the shape of the master plate in the flexed condition. The extent of bow is approximately .012 inch to provide the required cylindrical shape for the initial line contact of the film with the master plate. As the plate 46 assumes the cylindrical shape, as seen in FIG. 2, by reason of the pressurized chamber, and with the lips 39 and 41 of the rails 38 and 40 restraining the two sides of the plate, the air seal will become broken at the ends of the plate due to the flexed plate then relieving the upper O-ring 34. As the seal is broken, the total air pressure on the under side of the master plate is decreased, so that the descending platen pressure is higher than the chamber pressure. The air supply pressure is maintained through the bore 54 and the passageway 56, and the platen descends toward the master plate, initially making a line contact down the center of the convex surface. Continued lowering of the platen with its now greater counter force tends to straighten the bowed master plate while simultaneously forcing any and all air pockets or bubbles out from between the film and the plate. As the master plate is brought into substantially a straight or flat condition, as shown in FIG. 3, the seal again becomes effective around the chamber 47, and the platen 48 makes full contact of the film 16 with the master plate 46. Since the seal is effective on all sides as the master plate becomes substantially straight, the chamber pressure and the opposing platen pressure or force maintain the plate in contact with the film, and optimum contact printing is accomplished.

It is thus seen that the contact printing apparatus, as shown and described, fulfills all he advantages and features set out above, in that the initial contact is a line contact and further movement of the platen over the plate removes any air pockets or bubbles from the surface of the master plate. It is therefore extremely important to develop the contact pressure from the center of the master plate to the outer edges. In case the pressures are not exact on each side of the master plate, the platen is sufficiently resilient to conform to the shape of the master plate. It is, of course, desirable that the pressure inside the chamber be controlled to the extent that the master plate is always flexed upwardly exactly the same amount and is returned to its original position for optimum printing; however, slight variations in the supply pressure, inherent characteristics of the master plate and O-ring materials, and the effective force of the platen against the film during the printing cycle may not allow the plate to be returned to the fully unflexed or flat condition. In this respect, there would be some straightening of the flexed plate and some curving of the platen around the cylindrical surface of the plate at the time of printing. In either case, the initial contact is along a line, and full contact is made as the surfaces are brought to conform to each other. In the embodiment illustrated, the glass plate 26 is approximately one-fourth inch thick, and the master plate 46 is likewise of glass material about one-sixteenth inch thick, so that the glass plate 26 is sufficiently strong to prevent flexing or breakage, and the master plate 46 is free to flex under the pressure introduced into the chamber. The use of the air chamber 47 enables development of a relatively high value of contact pressure on the thin master plate of glass, which contains the image. The higher pressure thus provides for optimum contact across the entire surface of the plate, in that any and all air pockets or bubbles are forced out from between the film and the plate, and the film is free from printing defects. The pressure chamber also eliminates the requirement for a back-up or supporting plate for the master plate, which, under certain circumstances, could cause optical interference.

Variations of the present invention may occur to those skilled in the art, and it is to be understood that all such variations are contemplated as being within the scope of the invention. The invention is not to be taken as limited to the specific embodiment shown and described, nor, in fact, in any manner except as defined in the following claims.

What is claimed is:

1. Contact printing mechanism for reproducing high resolution images on film material, said mechanism including:
   a base plate defining an aperture therein,
   a transparent glass plate supported from said base plate and covering said aperture,
   a flexible master plate supported and spaced from the glass plate and carrying an original image thereon, said glass and master plates forming a chamber therebetween,
   means adjacent the glass and master plates for sealing the chamber,
   means connected with said chamber and with a supply source for pressurizing the chamber, and
   a platen assembly forcibly engageable with said film material and adapted to press the film into contact with the master plate, said master plate being convexly formed in relation to the platen by the introduction of pressure into said chamber, and said platen assembly having means capable of conforming to the shape of the master plate and tending to straighten it in opposition to the pressure in the chamber, whereby full contact is made across the master plate when exposing an image from the master plate onto the film material.

2. A mechanism in accordance with claim 1 wherein the master plate is convexly formed upon introduction of air pressure into said chamber prior to engagement of the platen assembly with the film material for establishing line contact therewith.

3. A mechanism in accordance with claim 1 wherein the master plate is cylindrically shaped, permitting escape of air pressure from said chamber prior to sealing of the chamber.

4. A mechanism in accordance with claim 1 wherein the force of said platen assembly exceeds the pressure in said chamber, permitting the master plate assembly to straighten as the platen fully presses the film material onto the plate.

5. A mechanism in accordance with claim 1 wherein the platen assembly includes a resilient element capable of conforming to the shape of the master plate.

6. In a photographic contact printer including means for maximizing surface contact, said means comprising:
   a base plate carrying a frame having a first member and a second member interconnected,
   a flat transparent glass plate supported from said first member,
   a master plate supported from said second member and spaced from the glass plate, said glass plate and said master plate forming an air chamber therebetween,
   means connected with the second member permitting flexing of said master plate,
   a photographic film adjacent and engageable with the master plate,
   a platen assembly positioned to press the film against the master plate,
   means connected with said second member and with a source of supply for introducing pressure into said chamber for flexing the master plate, and
   resilient means adjacent the glass and master plates for sealing the chamber after application of pressure, whereby the platen assembly pressure on the film against the master plate tends to straighten the master plate from the flexed condition to a condition for full contact between the film and the plate.

7. In a contact printer in accordance with claim 6 wherein said means permitting flexing of the master plate includes a pair of rail members each defining a lip thereon for restraining the edges of the plate.

8. In a contact printer in accordance with claim 6 wherein said platen assembly includes a generally rectangular resilient member engageable with the film.

9. A contact printing device for light-sensitive film including:
   a base plate having an aperture therein,
   a frame assembly supported from the base plate, said assembly having a first member and a second member interconnected and forming a frame for admittance of light therethrough,
   a first plate supported from the first member,
   a second plate spaced from the first plate and supported from the second member, said second plate having an original image thereon and adapted to flex upon application of force from one side,
   means for sealing the space between the first and second plates,
   means connected to the frame assembly for introducing force to flex said second plate while restraining the sides of the plate, the flexing of said plate providing for unsealing said space between the plates, and
   a platen member positioned to engage with said film and forcibly press the film against the second plate, thereby tending to straighten the second plate upon sealing the space for full contact with said platen member as light is admitted through the aperture of the base plate.

10. A printing device in accordance with claim 9 wherein the platen member is a resilient pressure pad having a surface for conforming to the shape of the second plate.

11. A printing device in accordance with claim 9 including rail members connected to the second member and having portions frictionally engageable with the surface of the second plate for restraining movement of said plate.

12. In a contact printer for reproducing an image from an original onto a photographic film,
   first and second interconnected members defining a generally rectangular apertured frame assembly,
   a transparent plate supported from the first member and extending across the aperture,
   a flexible master plate incorporating an original image, supported from the second member, and spaced from the transparent plate to define an air chamber therebetween,
   means for introducing pressure into the chamber to flex the master plate permitting escape of air pressure thereby in one position of the plate,
   sealing means adjacent the plates for preventing escape of air pressure in another position of the master plate, and
   means engageable with said film and positioned to press the film against the master plate tending to straighten the master plate from the flexed condition, whereby the initial line contact progresses to full contact of the engageable means and the master plate.

13. In a contact printer in accordance with claim 12 including means adjacent the second member for limiting movement of the sides of the master plate.

14. In a contact printer in accordance with claim 12 wherein the means positioned to press the film against the master plate is a resilient pressure pad adapted to conform to the shape of the flexible master plate.

15. A method of contact printing on a light-sensitive film by means including a rigid and a flexible glass sided air chamber and a pressure-exerting platen, comprising the steps of:
   advancing the film into position between the platen and the flexible side of the chamber,
   admitting pressure into the air chamber to slightly bow the flexible side thereof,
   lowering the platen into engagement with the film and thereby pressing the film against the flexible side,
   allowing an amount of air to escape from the chamber to permit straightening of the flexible side, and
   further lowering the platen tending to remove the bow from the one side for full contact of the platen with the film and of the film with the one side.

References Cited
UNITED STATES PATENTS

| | | | |
|---|---|---|---|
| 1,888,527 | 11/1932 | Edouart | 355—104XR |
| 2,437,229 | 3/1948 | Mears | 355—92 |
| 3,316,825 | 5/1967 | Carlson et al. | 355—104 |
| 3,318,219 | 5/1967 | Anderson | 355—91XR |

JOHN M. HORAN, Primary Examiner

R. L. MOSES, Assistant Examiner

U.S. Cl. X.R.

355—87, 94